(12) United States Patent
Rösseler et al.

(10) Patent No.: US 12,215,755 B2
(45) Date of Patent: Feb. 4, 2025

(54) RESTRICTION FOR A VIBRATION DAMPER

(71) Applicant: ZF Friedrichshafen AG, Friedrichshafen (DE)

(72) Inventors: Jörg Rösseler, Ruppichteroth (DE); Aleksandar Knezevic, Eitorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 59 days.

(21) Appl. No.: 17/377,461

(22) Filed: Jul. 16, 2021

(65) Prior Publication Data

US 2022/0025956 A1 Jan. 27, 2022

(30) Foreign Application Priority Data

Jul. 21, 2020 (DE) .......................... 102020209113.7

(51) Int. Cl.
| | | |
|---|---|---|
| *F16F 9/512* | (2006.01) | |
| *F16F 9/19* | (2006.01) | |
| *F16F 9/36* | (2006.01) | |
| *F16F 9/48* | (2006.01) | |

(52) U.S. Cl.
CPC ............... *F16F 9/512* (2013.01); *F16F 9/19* (2013.01); *F16F 9/369* (2013.01); *F16F 9/48* (2013.01)

(58) Field of Classification Search
CPC .......... F16F 9/512; F16F 9/5126; F16F 9/348; F16F 9/34; F16F 9/3405; F16F 9/3488; F16F 9/466; F16F 9/19; F16F 9/3482; F16F 9/369
See application file for complete search history.

(56) References Cited

U.S. PATENT DOCUMENTS

| | | | | | |
|---|---|---|---|---|---|
| 2,252,772 | A | * | 8/1941 | Katcher ................... | B62D 7/22 188/320 |
| 4,433,759 | A | * | 2/1984 | Ichinose ................. | F16F 9/346 188/282.8 |
| 4,503,951 | A | * | 3/1985 | Imaizumi ................ | F16F 9/516 267/64.15 |
| 4,838,393 | A | * | 6/1989 | Mourray .................. | F16F 9/49 188/284 |
| 5,042,625 | A | * | 8/1991 | Maus ..................... | B62K 21/08 188/322.22 |
| 5,799,759 | A | * | 9/1998 | Koch .................... | F16F 9/0245 188/300 |
| 6,129,343 | A | * | 10/2000 | Ecarnot ................. | F16F 9/0209 188/322.22 |
| 7,726,451 | B2 | * | 6/2010 | Hammer ................. | F16F 9/341 188/320 |

(Continued)

OTHER PUBLICATIONS

DE 102017204923 A1 (Year: 2018).*
DE 102017211300 B3 (Year: 2018).*

*Primary Examiner* — Robert A. Siconolfi
*Assistant Examiner* — Mahbubur Rashid
(74) *Attorney, Agent, or Firm* — Kristin L. Murphy

(57) ABSTRACT

A damping valve device for a vibration damper is disclosed, the damping valve device comprising a valve body of variable diameter, which is guided by a valve support and, starting from a passage position, adopts a restricting position as a function of a speed of flow of a damping medium within the restriction by a radial closing movement in the direction of a flow guiding surface. The closing movement of the valve body is controlled by at least one damping device.

19 Claims, 11 Drawing Sheets

(56) References Cited

U.S. PATENT DOCUMENTS

| | | | | |
|---|---|---|---|---|
| 8,104,140 B2* | 1/2012 | Bassi | ............... | F16F 9/20 |
| | | | | 16/84 |
| 9,534,435 B2* | 1/2017 | Dora | ............... | E05F 5/10 |
| 9,605,726 B2* | 3/2017 | Baldoni | ............... | F16F 9/49 |
| 9,822,569 B2* | 11/2017 | Wang | ............... | E05F 3/02 |
| 10,603,974 B2* | 3/2020 | Kasprzyk | ............... | F16F 9/3235 |
| 2003/0006539 A1* | 1/2003 | Bertram | ............... | F16F 9/368 |
| | | | | 267/120 |
| 2004/0251099 A1* | 12/2004 | Papp | ............... | F16F 9/3485 |
| | | | | 188/322.15 |
| 2006/0118371 A1* | 6/2006 | Zimmer | ............... | F16F 7/09 |
| | | | | 188/280 |
| 2010/0140031 A1* | 6/2010 | Miyasato | ............... | F16F 9/19 |
| | | | | 188/280 |
| 2010/0287729 A1* | 11/2010 | Jin | ............... | E05F 3/108 |
| | | | | 16/72 |
| 2019/0128361 A1* | 5/2019 | Rösseler | ............... | F16F 9/5126 |

* cited by examiner

RESTRICTION FOR A VIBRATION DAMPER

CROSS-REFERENCE TO RELATED APPLICATION

This application claims priority to German Patent Application No. 102020209113.7 filed Jul. 21, 2020, the disclosure of which is incorporated herein by reference in its entirety.

TECHNICAL FIELD

The disclosure relates to a restriction for a vibration damper.

BACKGROUND

DE 10 2016 210 790 A1 discloses a damping valve device which has a valve body of variable diameter that performs a radial closing movement as a function of a speed of flow within a restrictor, as a result of which a restrictor cross section of the restrictor is varied.

The valve body has a transverse slot and is radially elastic. A limiting ring determines a maximum expansion of the valve body and additionally ensures a return movement of the valve body in a direction of its initial position, in which a passage cross section of the restriction is also at the maximum.

In such a damping valve device, the response behavior of the valve body to a changing flow situation decisively determines the quality of the damping valve device. The speed of response and size of the minimum restrictor cross section play an essential role in this.

What is needed is a damping valve device of the type above with increased functional quality.

SUMMARY

A valve body is disclosed wherein a dosing movement of the valve body is controlled by at least one damping device.

The damping device can be used to exert a very powerful effect on the speed of response of the damping valve device. The maximum damping force that can be achieved can be regarded independently of the speed of response. In addition to the speed of response, a point of engagement of the damping valve device also changes.

In a further advantageous exemplary arrangement, the damping device is supported on a valve support. The aim is to avoid promoting any additional frictional effects between the damping valve device and a cylinder. Furthermore, the damping device would then be dependent on dimensional tolerances of the cylinder.

A first possibility for adapting the damping device and thus the operating behavior of the damping valve device includes the damping device becoming effective only after a free travel of the valve body. Starting from a maximum passage position of the valve body, the damping force of the restrictor increases only moderately. This first effective range of the restrictor can be traversed quite quickly in order to be able to build up a high damping force with corresponding speed. This setting is appropriate for vibration dampers of more sporty design.

With the aim of an orientation of the restrictor that is more conducive to comfort, the damping device can be effective from a home position of the valve body. A distinction is to be made here as to whether the damping device generates a basic damping force right from the home position or builds up a damping force only after the onset of the expansion movement.

In principle, the valve body can control a plurality of damping devices, which are placed around the valve body in the circumferential direction, for example, and which become effective at different diameter sizes of the valve body. The damping device then acts in a cascade-like manner and thus permits very selective adaptation to a desired damping force characteristic of the damping device.

A particularly simple design of the damping device is formed by at least one elastomer body.

Alternatively, the damping device can be embodied as a hydraulic damping device.

A combination of the two construction principles can be achieved by embodying the elastomer body as a hollow body which can be filled with damping medium. This design is also very simple to produce and assemble.

It is by no means absolutely necessary that a damping valve device fundamentally requires a damping device for the valve body. In order to be able to use a standard design for the valve support, the damping device is supported on a cap of the valve support. Furthermore, an additional cap makes it possible to simplify the assembly of the damping valve device and to create additional installation space for the damping device.

In the case of a hydraulic damping device, a particularly simple design can be achieved if the valve body and the valve support form a pressure chamber which is compressed during an expansion movement of the valve body, since components which are present in any case are used for the pressure chamber.

A minimalist design is distinguished by the fact that the pressure chamber is bounded by a top side of the valve body and a section of a side wall of the annular groove. All that is then required to make available the finished pressure chamber is to insert a seal or to form a raised annular wall on both sides.

Alternatively, the valve support can have the hydraulic damping device having at least one pressure chamber which is filled with damping medium and in which a displacement body controlled by the valve body performs a working movement. This design offers numerous parameters for adapting the damping characteristic of the damping device.

In a further embodiment, the pressure chamber is formed by the valve body. This variant offers the advantage of simple assembly since the components of the damping device are mounted on the valve body and are only then inserted into an annular groove of the valve support.

For this purpose, there is also the possibility that the displacement body is designed as a connecting rod which is mounted on the valve support. The return movement of the valve body always moves the displacement body into its initial position. No separate return spring is required for the displacement body.

BRIEF DESCRIPTION OF THE DRAWINGS

The disclosure will be explained in greater detail with reference to the following description of the figures.

in which.

DETAILED DESCRIPTION

Figure 1:
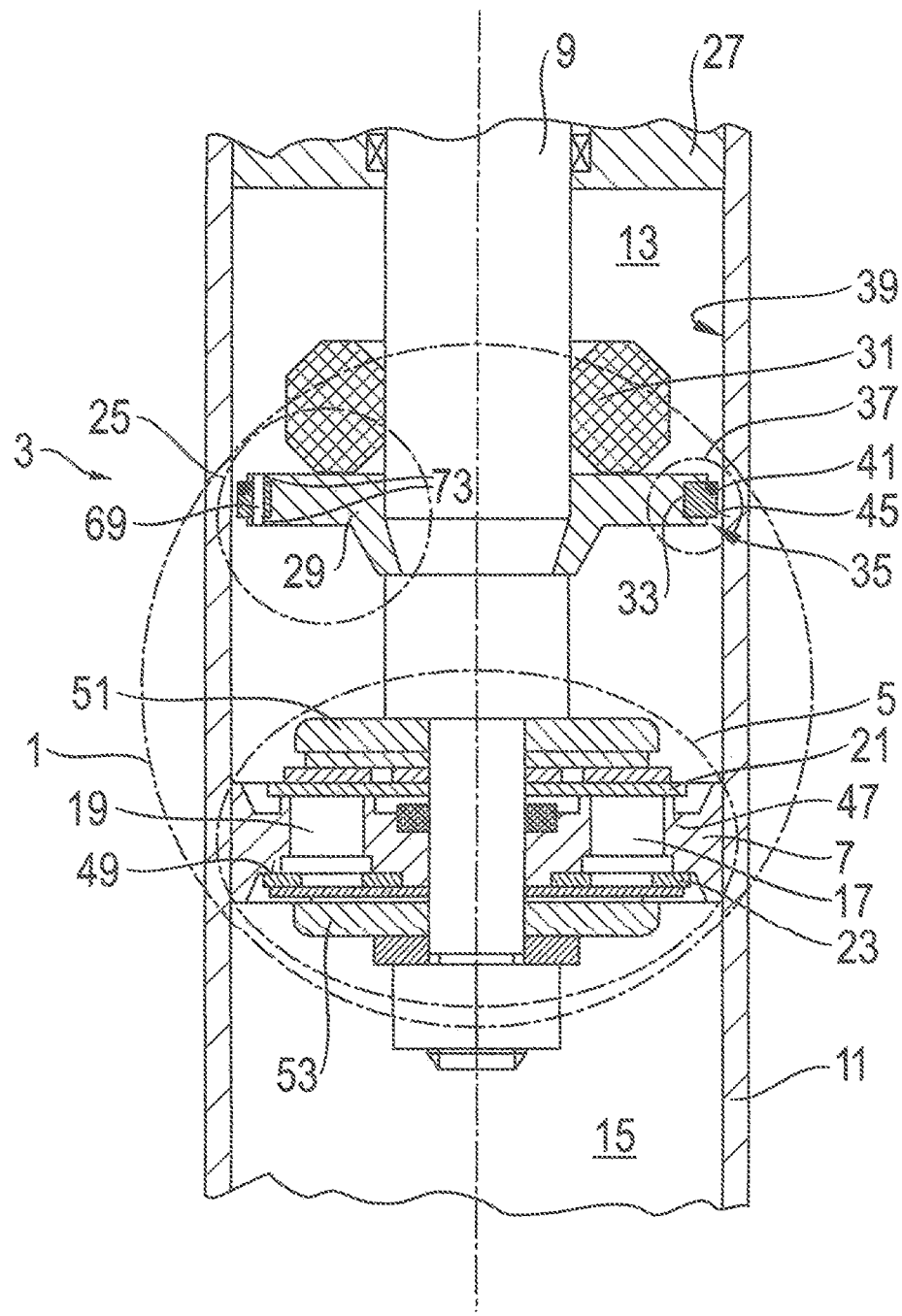
FIG. 1 shows a sectional view through a vibration damper in the region of a damping valve device.

FIG. 1 shows a damping valve device 1 for a vibration damper 3 of arbitrary construction, illustrated only in part. The damping valve device 1 comprises a first damping valve 5 having a damping valve body embodied as a piston 7, which is secured on a piston rod 9.

The damping valve body 7 divides a cylinder 11 of the vibration damper 3 into a working chamber 13 on a piston-rod side and a working chamber 15 on the side remote from the piston rod 9, both of said chambers 13, 15 being filled with damping medium. Through channels 17, 19 for respective through flow directions are formed on different pitch circles in the damping valve body 7. The configuration of the through channels 17, 19 should be regarded as purely illustrative. An outlet side of the through channels 17; 19 is covered at least partially by at least one valve disk 21; 23.

In addition, the vibration damper 3 has a tension stop 25, which comes to rest against a stop surface of the cylinder, e.g. a piston rod guide 27, from a defined extension movement of the piston rod 9 onward.

The tension stop 25 comprises a tension stop disk as a valve support 29, which is fixed directly on the piston rod by a positive joint. By way of example, an annular elastomer element 31, which is held by a slight radial prestress even in the case of a vibrational movement of the piston rod 9, is placed on an upper side of the valve support 29. Starting from the point of stop contact with the stop surface, the elastomer element 31 acts as an additional supporting spring.

The support 29 has an encircling groove 33, in which a valve body 35 of variable diameter is guided. This valve body 35 can be expanded in diameter and forms one component of a restriction 37 as part of the damping valve device 1. With the inner wall 39 of the cylinder 11, the valve body 35 forms the restriction 37, wherein the inner wall 39 forms a flow guiding surface. In principle, the disclosure can also be formed in a support disk that is independent of the tension stop.

On the outside, the valve body 35 carries a return spring 41, e.g. in the form of a retaining rind. This return spring 41 optionally also performs the function of an expansion limiter for the valve body 35.

At a piston rod speed in a first operating range, e.g. less than 1 m/s, the restriction 37 is fully open. The damping force is then produced exclusively by the through channels 17; 19 in conjunction with the valve disks 21; 23. When there is a flow toward the valve disks 21; 23, the valve disks 21; 23 rise from their valve seating surface 47; 49. The lifting movement is in each case limited by a supporting disk 51; 53.

In a second operating range with a piston rod speed which is greater than the limit speed of the first operating range, i.e. greater than the 1 m/s indicated by way of example, the valve body 35 moves into a restricting position and, in the process, performs a closing movement in the direction of the flow guiding surface 39. Owing to the high speed of flow of the damping medium in the restriction 37 shaped as an annular gap, a reduced pressure is formed, leading to radial expansion of the valve body 35. However, to ensure that there is no possibility of blockage of the restriction 37, the defined minimum passage cross section is maintained by the return spring 41, or the valve body has external profiling which, together with the flow guiding surface 39, defines the minimum passage cross section.

Figure 2:
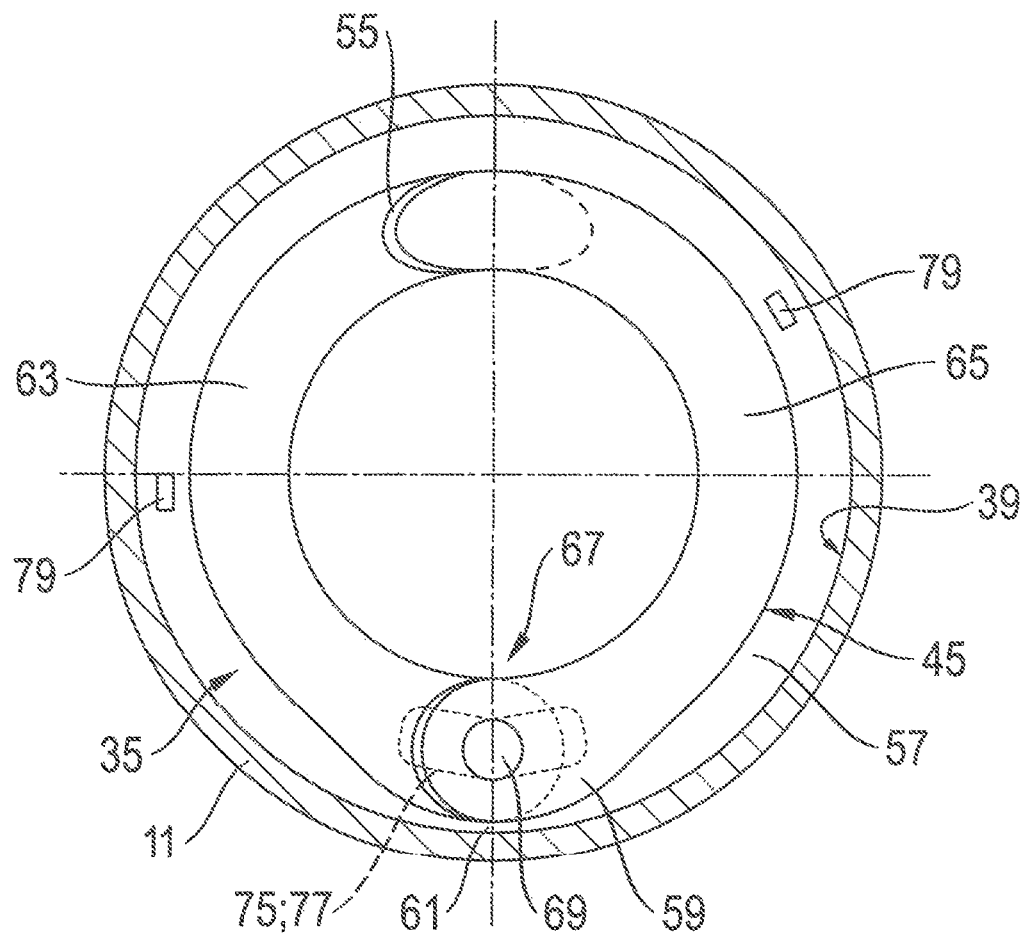
FIG. 2 shows a plan view of a valve body of a restrictor shown in FIG. 1.

FIG. 2 shows a plan view of an optional valve body 35 from the cross section through the vibration damper 3 shown in FIG. 1. The valve support 29, the limiting ring 41 and the piston rod 9 have been omitted from the illustration for reasons of clarity. It can be seen that the valve body 35 has a transverse gap 55, which reduces the pressure force required for the radial expansion movement of the valve body 35. The valve body 35 is illustrated in the passage position at a minimum speed of flow. Consequently, the passage cross section 57 is the maximum. The passage cross section 57 is defined by the inner wall 39 of the cylinder 11 and the outer lateral surface 45 of the valve body 35.

The valve body 35 has a profile 59 which limits the annular cross section between the valve body 35 and the inner wall 39 of the cylinder 11. In this graphical illustration, the limiting profile 59 is embodied as a single radial projection on the lateral surface 45. This gives rise to a c-shaped restriction cross section 57. Between the cam-like projection 59 and the inner wall 39 there is a restriction cross section 61 of significantly reduced width which is maintained even in the case of a maximum expansion movement of the valve body 35. Here, the radial projection 59 or limitation is dimensioned in such a way that it affects a damping effect only in the operating range of the restriction 37 (FIG. 1). Owing to the relatively large circumferential extent of the radial profile 59, it may be possible to increase the clearance with respect to the lateral surface 45 of the valve body 35 outside the radial profile 59.

Furthermore, FIG. 2 shows that the valve body 35 comprises at least two limbs 63; 65, which are mounted in such a way as to be movable about a pivot bearing 67. This feature is independent of the radial projection 59 but the two features complement one another in an advantageous manner inasmuch as the limiting profile 59 forms a part, e.g. a bearing pin 69, of the pivot bearing 67.

In this exemplary arrangement, the limbs 63; 65 overlap in the circumferential direction, and the pivot bearing 67 is formed in the region of overlap. In the region of the transverse gap 55 too, there is an overlap between the two limbs 63; 65 in order to minimize a damaging leakage cross section. As FIG. 1 shows, the valve support 29 has two receiving openings 73, which receive the bearing pin 69. The receiving openings 73 in the valve support 29 can be embodied as simple through holes, for example. The same applies to the bearing openings 75; 77. To provide a certain play within the pivot bearing, however, it is also possible to provide for one bearing opening 75; 77 to be embodied as a slot in the circumferential direction of the limb.

When the restriction is activated, i.e. there is a correspondingly high speed of flow in the restriction cross section 57, the two limbs 63; 65 of the valve body perform a radial pivoting movement about the pivot bearing 67 in the direction of the inner wall of the cylinder 11. If there is full-surface contact of the limbs 63; 65, the restriction cross section 61 is still open and then determines the damping effect.

Figure 3:
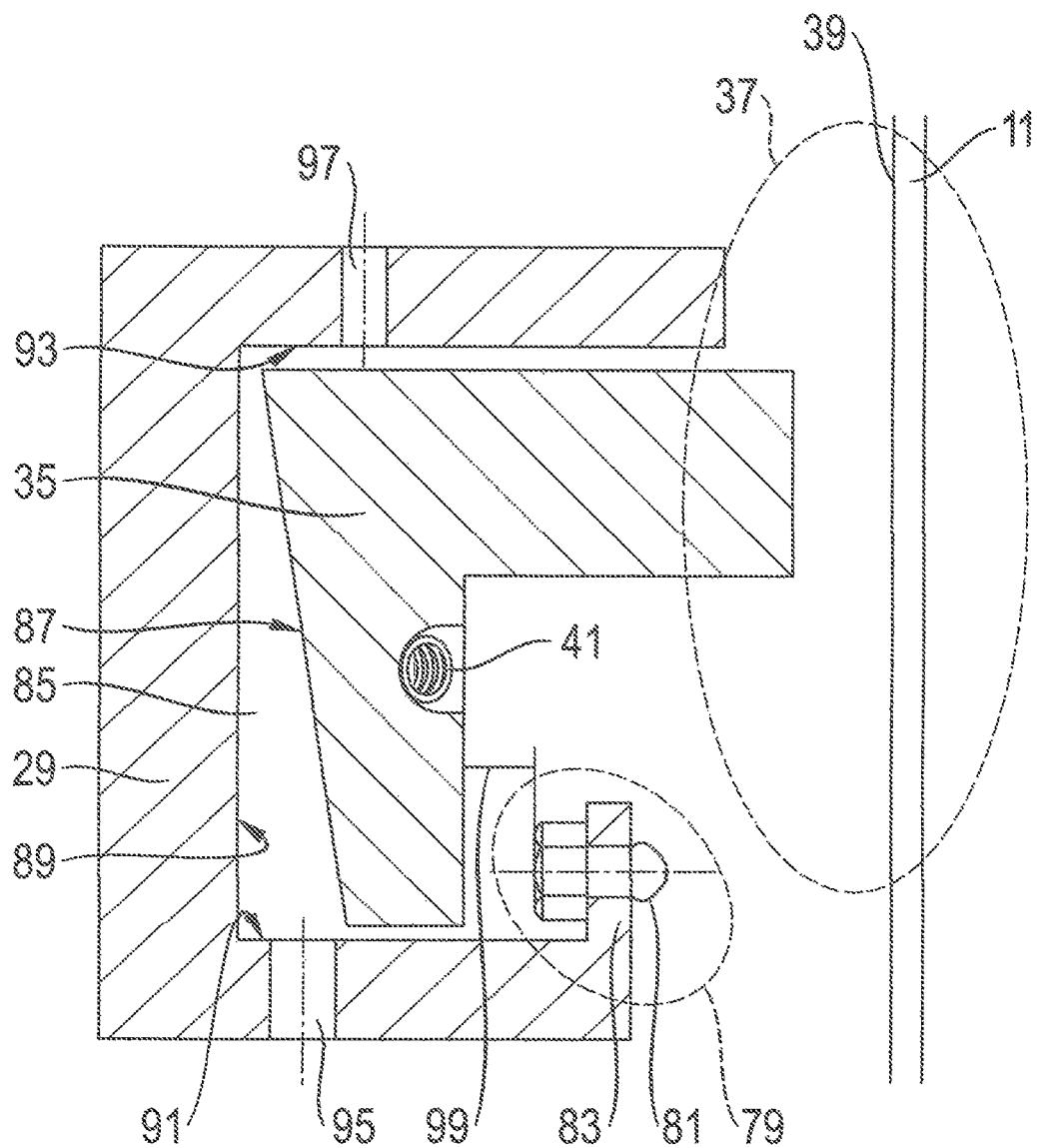
FIGS. 3 and 4 show a damping device having an elastomer body.

FIG. 3 is limited to a cross section through the valve support 29 in the region of the restriction 37. In this an enlarged view, it can be seen that the restriction 37 has a damping device 79, which acts counter to the closing movement of the valve body 35 and hence controls the overall behavior of the restriction 37.

In this exemplary embodiment, the damping device 79, which is formed by at least one elastomer body 81, is supported on the valve support 29. For this purpose, the valve support 29 has an encircling or, alternatively, segmented web 83, into which the at least one elastomer body 79 is fitted. Between the valve body 35 and the elastomer body 81 there is a radial clearance, thus ensuring that the speed of expansion and thus of response of the valve body 35 in a first actuating travel range is controlled by the pressures or pressure forces in a pressure chamber 85 and within the restriction 37 and by the force of the return spring 41. The pressure chamber 85 is bounded by an inner lateral surface 87 of the valve body 35, a groove bottom surface 89 and groove side walls 91; 93 of the valve support 29. Damping medium flows into the pressure chamber 85 via an inflow opening 95, and flows back out via an outflow channel 97. The cross section ratio of the inflow channel 95 to the outflow channel 97 affects the pressure buildup in the pressure chamber 85. As soon as the valve body has completed a free travel 99 by way of its radial expansion movement and is resting against the elastomer body 81, the elastomer body 81 exerts an additional spring force, on the one hand, and also a damping force counter to the expansion movement of the valve body 35. As a result, the expansion movement of the valve body in the direction of the flow guiding surface 39 on the cylinder 11 is slowed down.

Figure 4:
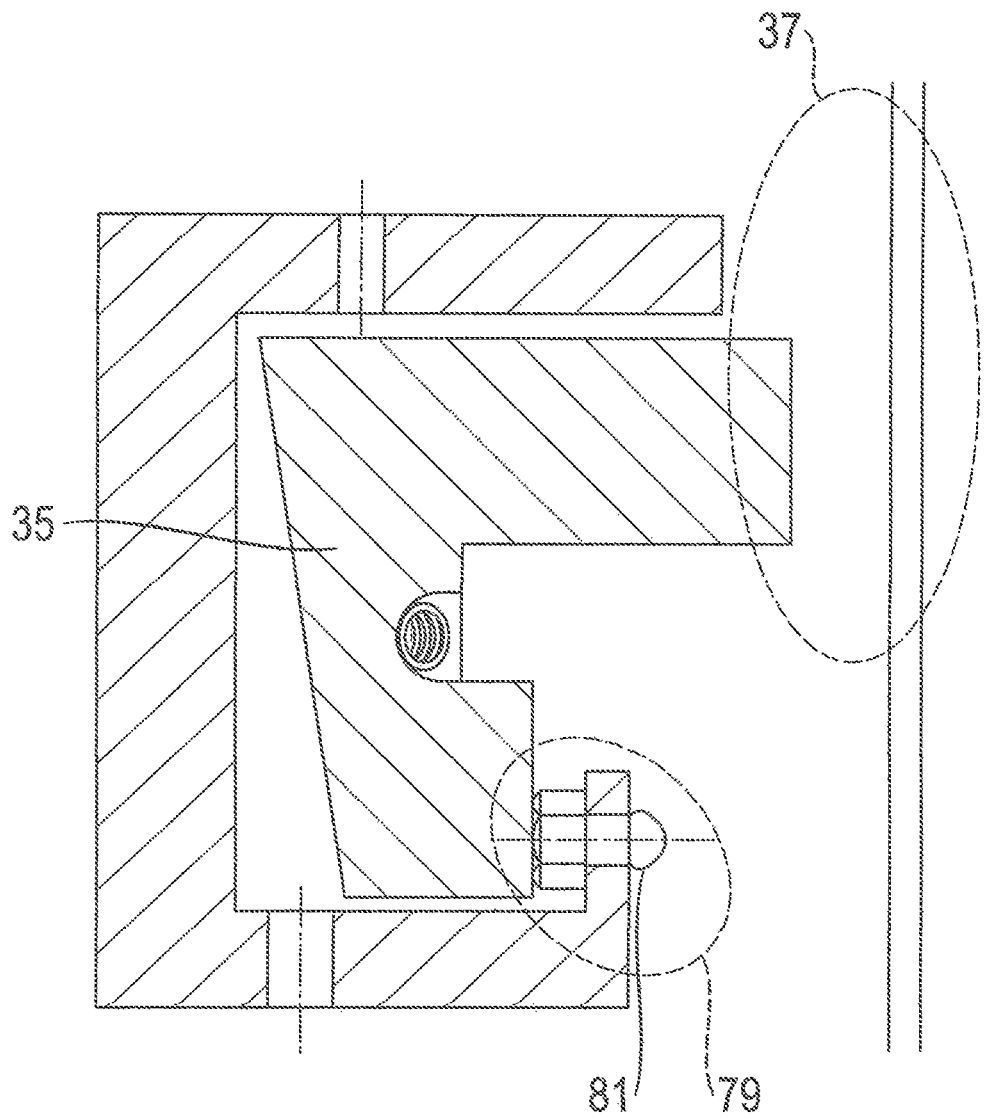

By way of example, FIG. 2 depicts two damping devices, which have a different free travel with respect to the limbs 63; 65. Thus, the damping devices 79 are effective at different diameter sizes of the valve body 35. By way of the number and the associated free travels 99, additional parameters are available for setting the restriction 37 and thus the entire damping valve device 1, FIG. 4 shows an embodiment of the restriction 37 based on FIG. 3, in which the damping device 79 of the restriction 37 becomes effective already in the case of an expansion movement starting from a home position with a minimum diameter of the valve body 35. In this case, provision can additionally be made for the elastomer body 81 to rest only against the valve body 35 or already to have a significant prestress, which takes effect as a counterforce acting on the expansion movement.

Figure 5:
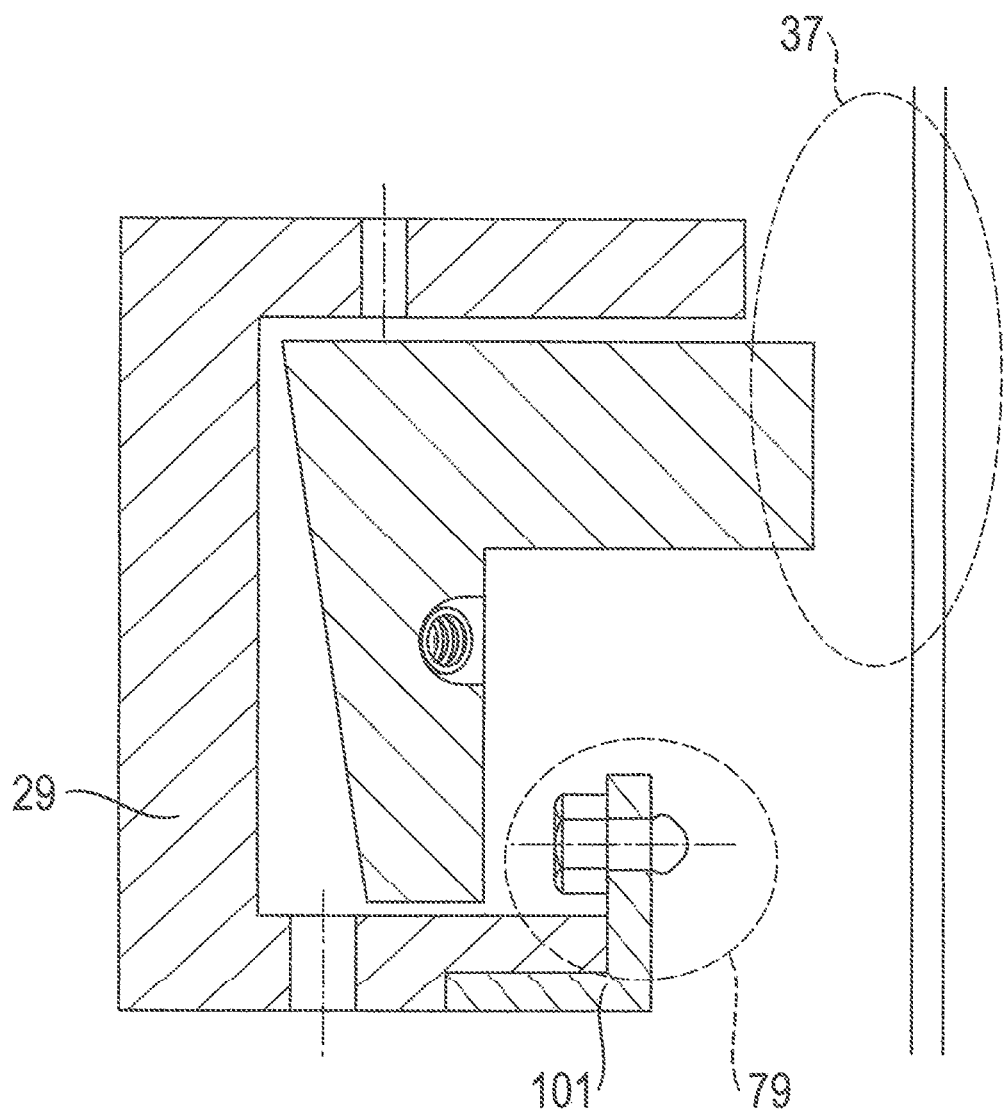
FIG. 5 shows a damping device on a cap of a valve support of the restrictor.

In contrast to the exemplary arrangement shown in FIG. 3, the damping device 79 shown in FIG. 5 is supported in a cap 101 separate from the valve support 29. This cap 101 can be used as an option and offers the advantage that the valve support 29 does not have a web 83 to close the annular groove 33, and therefore production of the valve support 29 is simpler. In the exemplary arrangement depicted in FIG. 5, the cap 101 is centered on a shoulder of a top side of the valve support 29 and can simply be held by an interference fit since no significant axial forces arise.

Figure 6:
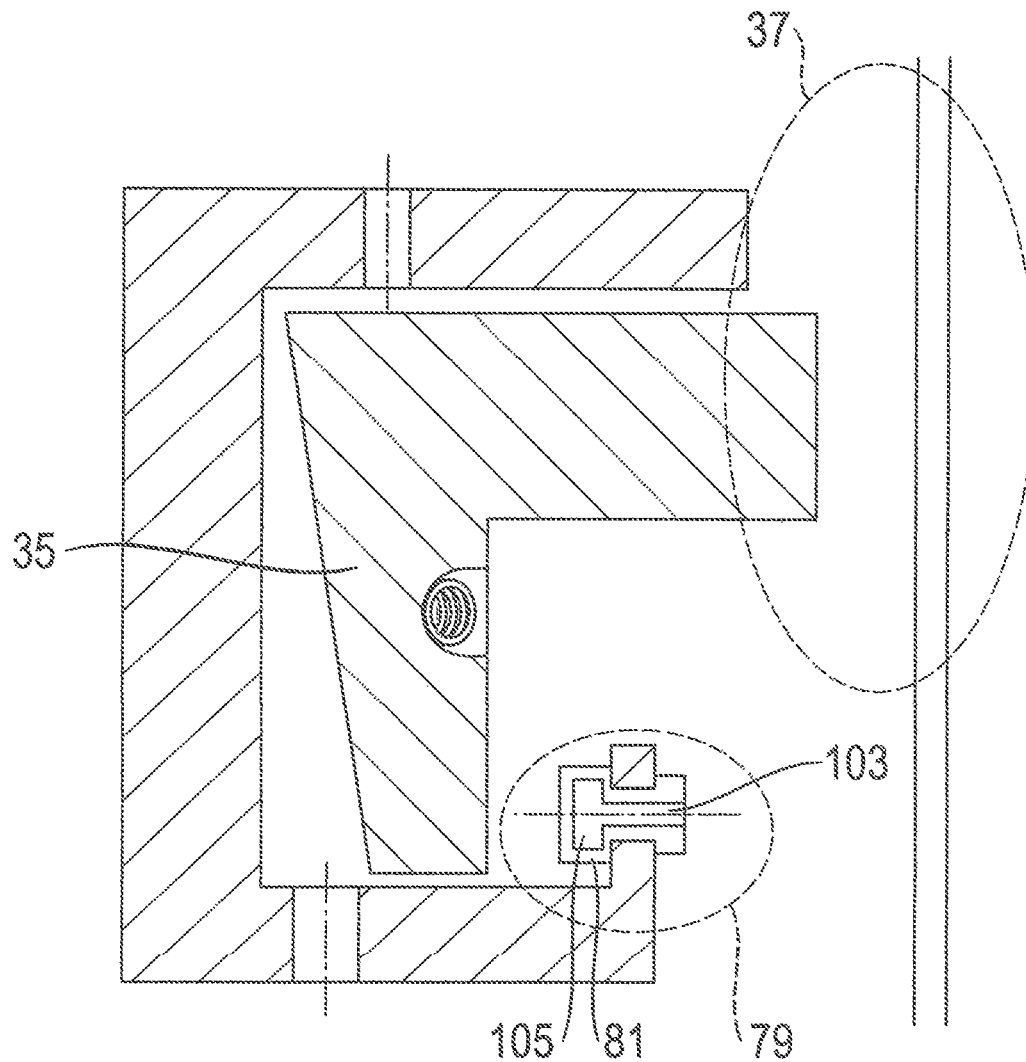
FIGS. 6-10 show a hydraulic damping device for the restrictor.

In the exemplary arrangements shown in FIGS. 3 and 4, the flexing work on the elastomer bodies is exploited for damping. FIG. 6 shows a variant in which the damping device additionally has hydraulic damping. For this purpose, an elastomer body 81 based on the construction principle shown in FIG. 3 is embodied as a hollow body that can be filled with damping medium and at least partially emptied via an opening 103. The opening 103 represents a restrictor via which a damping medium volume 105 is displaced from the hollow body by the expanding valve body 35. The hydraulic damping offers the further advantage of a speed-dependent effect of the damping device, i.e. when there is a relatively rapid expansion movement of the valve body 35, the damping device 79 also develops a higher damping force acting counter to it. In a return movement, the elastomer body 81 relaxes again, as a result of which the hollow body fills with damping medium via the opening 103.

Figure 7:
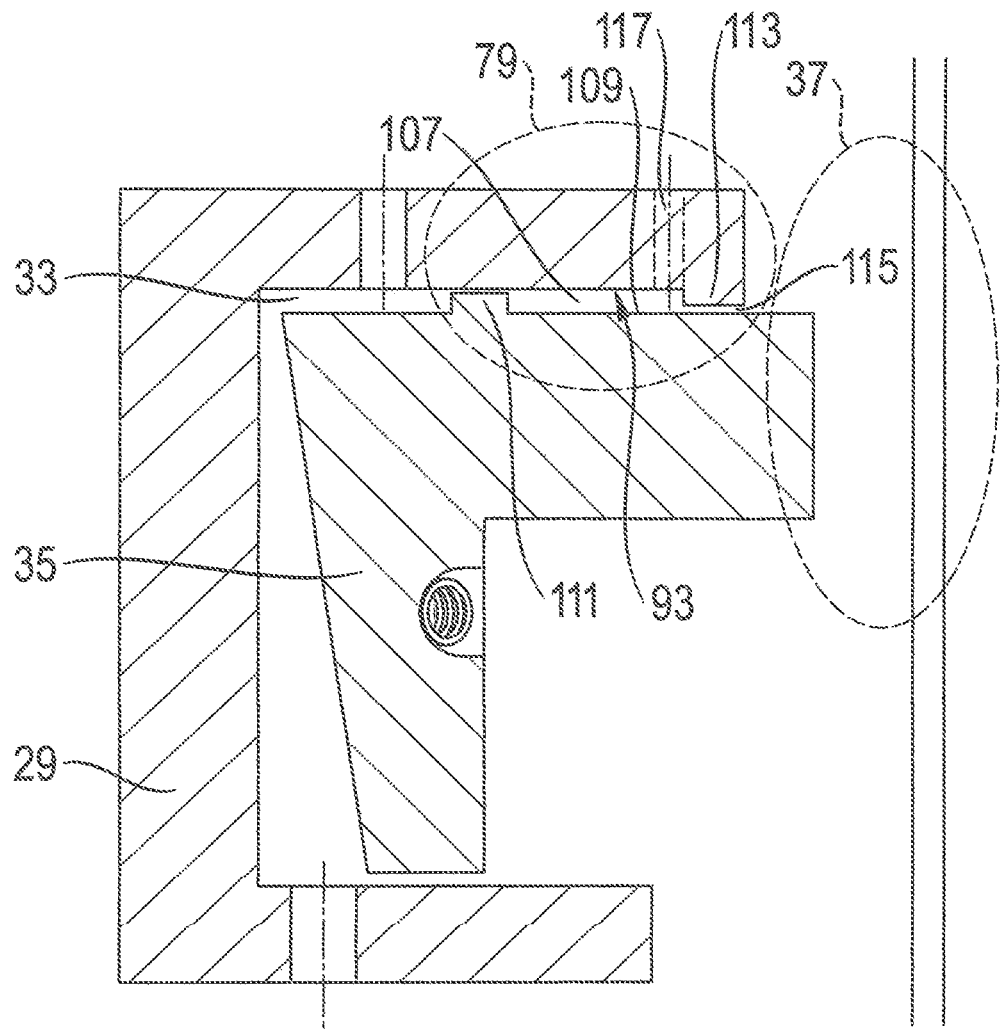

FIG. 7 illustrates a restriction 37 having a valve support 29 which likewise has a hydraulic damping device 79, in which the valve body 35 and the valve support 29 form a pressure chamber 107 that is compressed during an expansion movement of the valve body. For this purpose, the pressure chamber 107 is bounded by a top side 109 of the valve body and a section of a groove side wall of the annular groove 33. Respective annular webs 111; 113, which are also formed by a separate seal, are arranged on the top side 109 and on the groove side wall 93, respectively. The annular web 111 on the top side 109 extends with the clearance radially on the inside of the annular web 113 of the groove side wall 93. This variant is exclusively a hydraulically acting damping device 79. A gap 115 between the annular webs 111; 113 and the opposite wall regions or, alternatively, a separate restriction opening 117 (shown in phantom) in the valve support 29 can be used for dimensioning the restricting effect.

Figure 8:
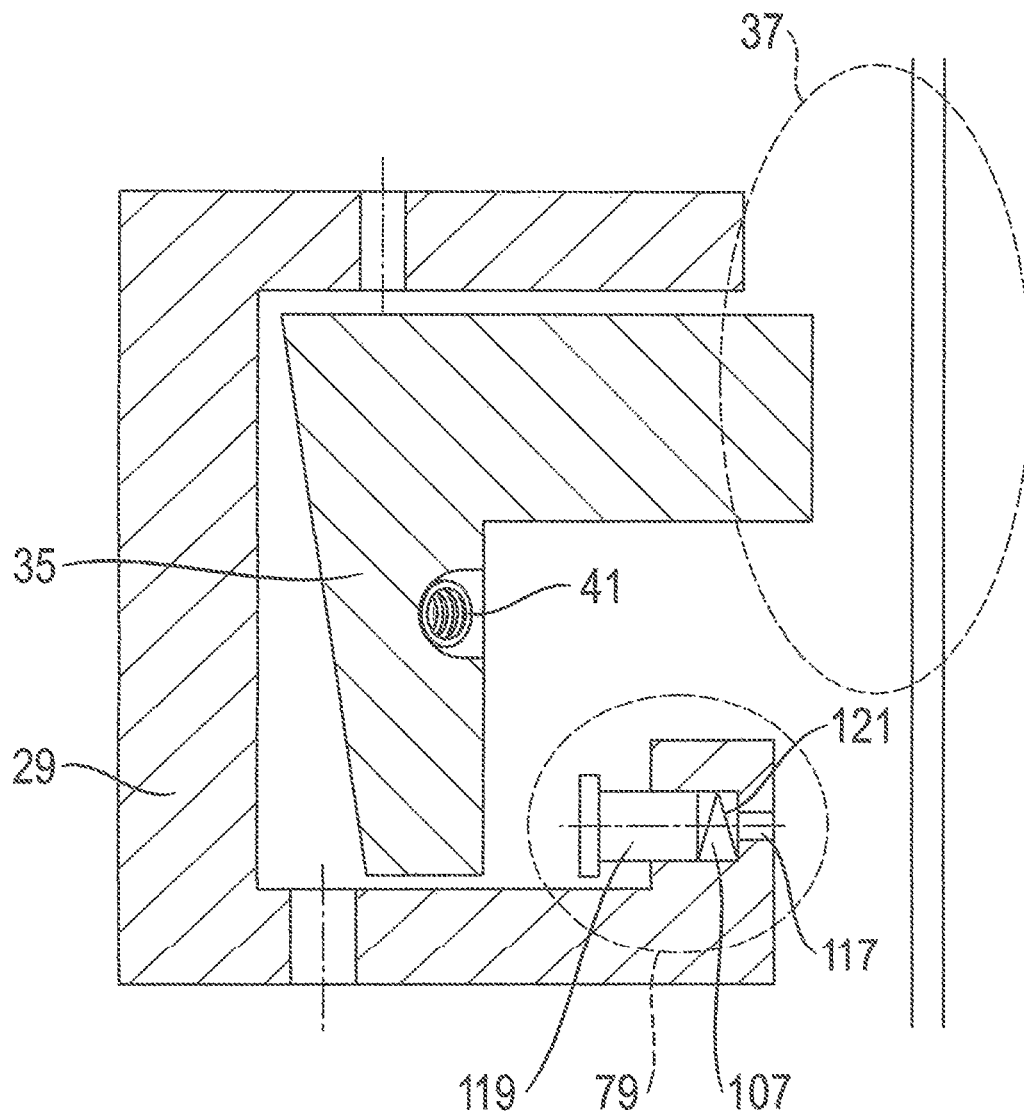

FIG. 8 describes a restriction 37 in which the valve support 29 has the hydraulic damping device having at least one pressure chamber 107 which is filled with damping medium and in which a displacement body 119 controlled by the valve body 35 performs a working movement. Here, the pressure chamber 107 is formed in the web 83 corresponding to FIG. 2 or in a cap 101 as per FIG. 4. No changes have to be made to the valve body 35 as compared with a conventional valve body 35.

A pin-shaped component, which enters the pressure chamber 107 and, in the process, displaces damping medium via the restriction opening 117, is used as a displacement body 119. A return spring 121 ensures that the displacement body 119 performs a return movement into an initial position. Here too, there is the possibility of a free travel design in which the displacement takes effect even in the home position of the valve body 35. The return spring 121 can be dimensioned in such a way that only the return movement of the displacement body 119 is ensured, but it is also possible to assist the return spring 41 with a higher spring force.

Figure 9:
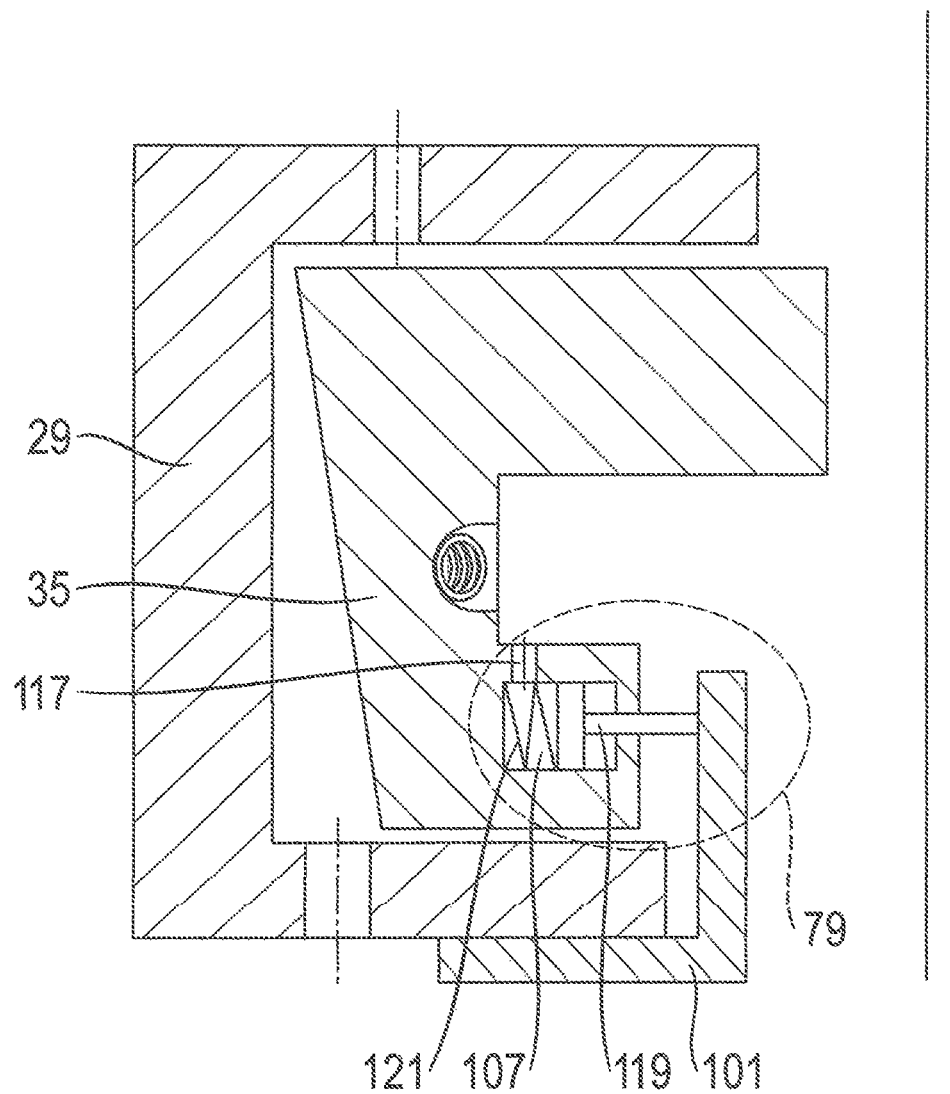

In the embodiment of the damping device 79 shown in FIG. 9, this device has been arranged in the valve body 35, i.e. the pressure chamber 107 is formed by the valve body 35. Here too, a restriction opening 117 in the valve body 35 is used to generate the damping force. In this case too, the cap 101 serves for simplicity of assembly. In principle, the valve support 29 too can be split axially with an upper part and a lower part. In other respects, the principle of action corresponds to the embodiment shown in FIG. 8.

Figure 10:
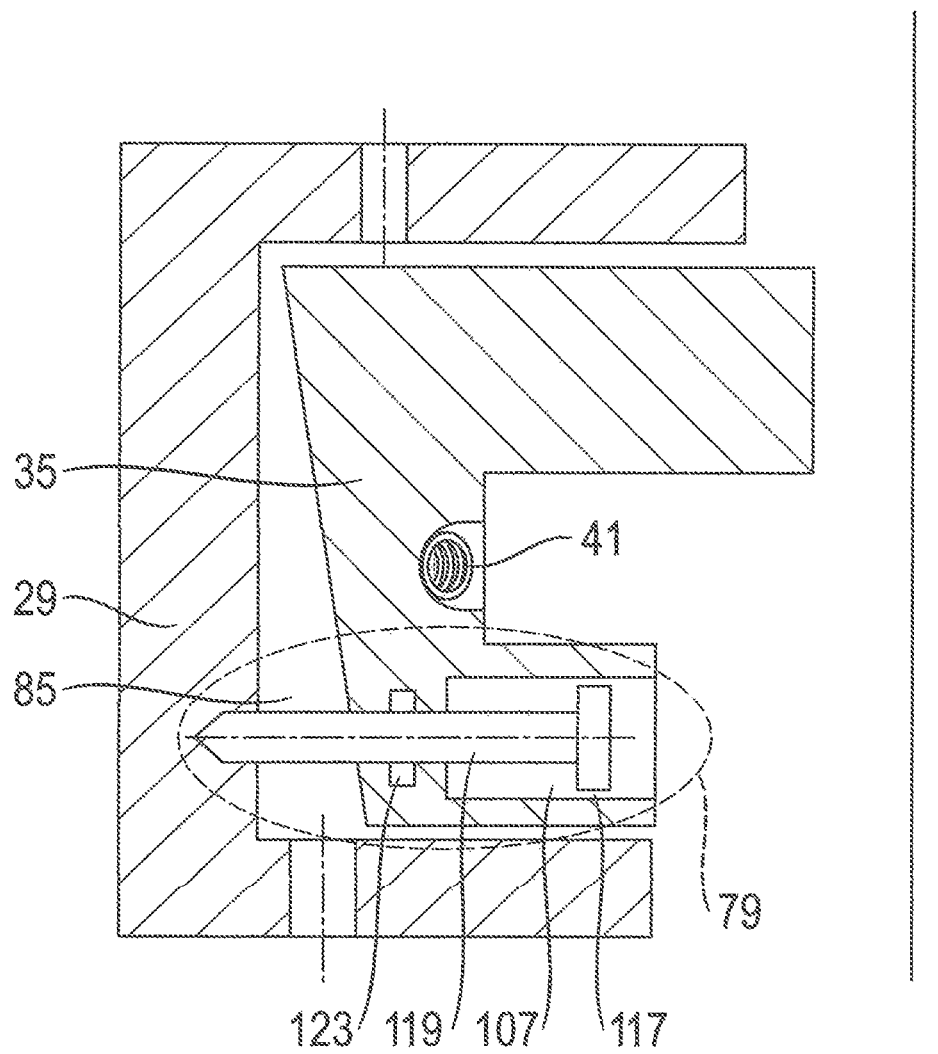

FIG. 10 shows a variant of a hydraulic damping device 79 in which the displacement body 119 is embodied as a connecting rod which passes radially through the valve body 35 and is mounted on the valve support 29. In the graphical illustration, the annular gap between the displacement body 119 and a wall of a stepped opening forming the pressure chamber serves as a restriction opening, in which the displacement body 119 is arranged. A seal 123 is responsible for sealing the pressure chamber 107 of the damping device 79 with respect to the pressure chamber 85 radially to the inside of the valve body 35.

By virtue of its mounting, the displacement body 119 can have a certain angular mobility in order to avoid hindering the expansion movement of the valve body 35. A return spring for the damping device 79 is not necessary since the return spring 41 of the valve body 35 ensures return of the displacement body 119 by way of the movement of the valve body 35 relative to the valve support 29.

Figure 11:
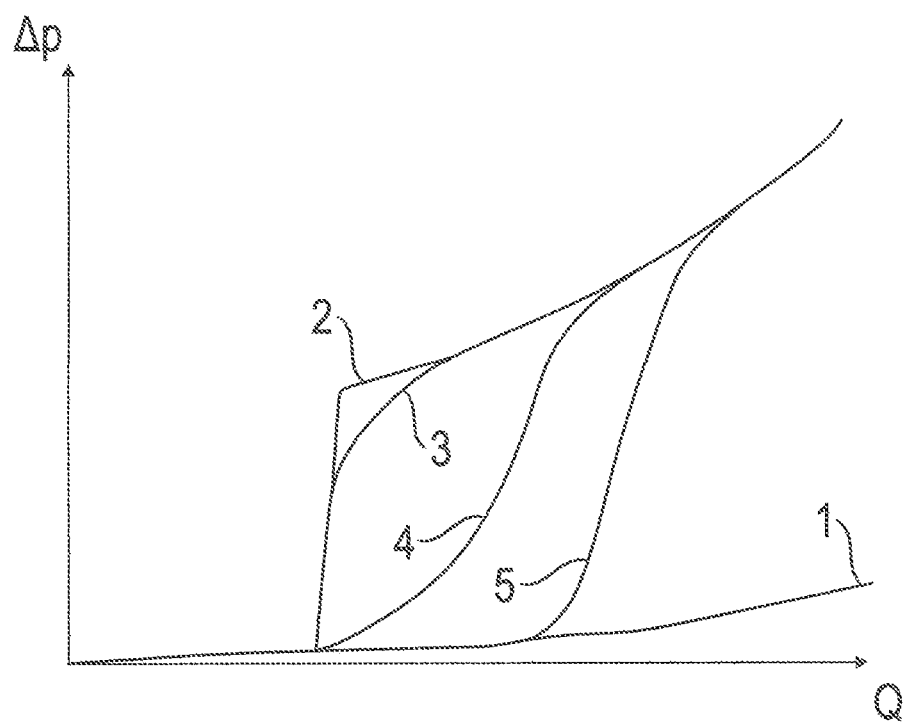
FIG. 11 shows damping force characteristics for the exemplary arrangement shown in FIGS. 3 to 10.

FIG. 11 shows the influence of the damping device 79 on the damping force behavior of the restriction 37. Damping force characteristic "1" describes the damping force behavior of the damping valve 5 without the restriction 37. The other extreme is described by damping force characteristic "2", which represents a restriction 37 without a damping device 79. As soon as a threshold for the volume flow Q has been reached and Δp occurs at the restriction 37, the restriction 37 comes into effect with a very progressive damping force rise, which is optionally flattened again by means of a pressure limiting valve.

By means of a damping device 79 which has a free travel 99, it is possible to achieve a comfort-enhancing rounding of the damping force characteristic in accordance with damping force characteristic "3". In the case of a damping device 79 which is not provided with a free travel 99, the damping force follows damping force characteristic "4". This damping force curve is significantly shallower. A displacement of the damping force characteristic "4" is achieved if the damping device 79 operates with a certain preload or prestress, that is to say not only takes effect but already acts with a damping force even at a minimum diameter of the valve body 35. An illustrative damping force characteristic "5" represents this principle of action.

The invention claimed is:

1. A restriction for a vibration damper, comprising a valve body of a variable diameter, which is guided by a valve support, and, starting from a passage position, the valve body adopts a restricting position as a function of a speed of flow of a damping medium by a radial closing movement in a direction of a flow guiding surface, wherein the closing movement of the valve body is controlled by at least one damping device acting against the valve body as the valve body moves in the direction of the flow guiding surface, wherein the damping device is movable to an engaging position from a home position of the valve body.

2. The restriction as claimed in claim 1, wherein the damping device is supported on the valve support.

3. The restriction as claimed in claim 1, wherein the damping device is movable to an engaging position after a free travel of the valve body.

4. The restriction as claimed in claim 1, wherein the damping device is formed by at least one elastomer body.

5. The restriction as claimed in claim 1, wherein the damping device is embodied as a hydraulic damping device.

6. The restriction as claimed in claim 5, wherein the device includes an elastomer body which is embodied as a hollow body that can be filled with damping medium.

7. The restriction as claimed in claim 5, wherein the valve support has the hydraulic damping device having at least one pressure chamber which is filled with damping medium and in which a displacement body controlled by the valve body performs a working movement.

8. The restriction as claimed in claim 7, wherein the pressure chamber is formed by the valve body.

9. The restriction as claimed in claim 8, wherein the displacement body is designed as a connecting rod which is mounted on the valve support.

10. The restriction as claimed in claim 8, wherein a seal is disposed within the valve body, the seal sealing the pressure chamber of the damping device with respect to a pressure chamber disposed within the valve support.

11. The restriction as claimed in claim 8, further comprising a cap and a displacement body connected to the cap, wherein the cap is mounted to the valve support.

12. The restriction as claimed in claim 11, further comprising a return spring operatively connected to the displacement body to return the displacement body to an initial position.

13. The restriction as claimed in claim 1, wherein the damping device is supported on a cap of the valve support.

14. The restriction as claimed in claim 13, wherein a pressure chamber is formed in the cap and a displacement body displaces damping media with respect to the pressure chamber via a restriction opening that is in communication with the pressure chamber.

15. The restriction as claimed in claim 14, further comprising a return spring operatively connected to the displacement body to return the displacement body to an initial position.

16. The restriction as claimed in claim 1, wherein the valve body and the valve support form a pressure chamber which is compressed during an expansion movement of the valve body.

17. The restriction as claimed in claim 16, wherein the pressure chamber is bounded by a top side of the valve body and a section of a side wall of an annular groove.

18. The restriction as claimed in claim 17, wherein annular webs are arranged on the top side and on the side wall, and a gap between the annular webs and opposite wall regions are used for dimensioning a restricting effect.

19. A restriction for a vibration damper, comprising a valve body of a variable diameter, which is guided by a valve support, and, starting from a passage position, the valve body adopts a restricting position as a function of a speed of flow of a damping medium by a radial closing movement in a direction of a flow guiding surface, wherein the closing movement of the valve body is controlled by a plurality of damping devices acting against the valve body as the valve body moves in the direction of the flow guiding surface, wherein each of the damping devices are movable to an engaging position at different diameter sizes of the valve body.

* * * * *